(12) United States Patent
Chen et al.

(10) Patent No.: US 11,513,818 B1
(45) Date of Patent: Nov. 29, 2022

(54) METHOD, PRODUCT, AND SYSTEM FOR INTEGRATING A HARDWARE ACCELERATOR WITH AN EXTENSIBLE PROCESSOR

(71) Applicant: Cadence Design Systems, Inc., San Jose, CA (US)

(72) Inventors: Rong Chen, San Jose, CA (US); He Xiao, Sunnyvale, CA (US); Nenad Nedeljkovic, Mountain View, CA (US); Nupur B. Andrews, Los Altos, CA (US); Dan Nicolaescu, Fair Oaks, CA (US); James Sangkyu Kim, San Jose, CA (US)

(73) Assignee: Cadence Design Systems, Inc., San Jose, CA (US)

(*) Notice: Subject to any disclaimer, the term of this patent is extended or adjusted under 35 U.S.C. 154(b) by 0 days.

(21) Appl. No.: 16/948,771

(22) Filed: Sep. 30, 2020

(51) Int. Cl.
*G06F 9/445* (2018.01)
*G06F 8/41* (2018.01)

(52) U.S. Cl.
CPC .......... *G06F 9/44521* (2013.01); *G06F 8/41* (2013.01)

(58) Field of Classification Search
None
See application file for complete search history.

(56) References Cited

U.S. PATENT DOCUMENTS

| | | | | |
|---|---|---|---|---|
| 6,477,697 B1 * | 11/2002 | Killian | ............... | G06F 30/30 716/103 |
| 6,701,515 B1 * | 3/2004 | Wilson | ............... | G06F 30/30 717/117 |
| 7,278,123 B2 * | 10/2007 | Ravi | ............... | G01R 31/318547 714/738 |
| 7,346,881 B2 * | 3/2008 | Wang | ............... | G06F 9/3885 716/137 |
| 7,937,559 B1 * | 5/2011 | Parameswar | ...... | G06F 9/30014 712/37 |
| 8,539,399 B1 | 9/2013 | Andrews et al. | | |

(Continued)

OTHER PUBLICATIONS

R. E. Gonzalez; "Xtensa: a configurable and extensible processor"; Mar.-Apr. 2000; IEEE Micro, vol. 20, No. 2, pp. 60-70. (Year: 2000).*

(Continued)

*Primary Examiner* — Umut Onat

(74) *Attorney, Agent, or Firm* — Vista IP Law Group, LLP

(57) ABSTRACT

An approach includes the use of a description of instructions for invoking hardware accelerator and for a hardware accelerator to execute those instructions. In some embodiments, the instructions for invoking hardware accelerator and for a hardware accelerator to execute those instructions are described using a single language. These descriptions are then compiled into other languages for use in tool chains for generating simulators (a hardware and instruction set simulator and a hardware accelerator simulator). In some embodiments, the approach illustrated herein can be combined with state machine functionality to manage the execution of instructions that require multiple states. In some embodiments, the approach illustrated herein can be combined with an external register file for transferring information between a processor and a hardware accelerator.

20 Claims, 7 Drawing Sheets

(56) References Cited

U.S. PATENT DOCUMENTS

| | | | |
|---|---|---|---|
| 8,966,413 B2* | 2/2015 | Shacham | G06F 30/30 |
| | | | 716/100 |
| 9,003,166 B2 | 4/2015 | Sinha et al. | |
| 9,164,735 B2* | 10/2015 | Hux | G06F 8/24 |
| 9,235,670 B2* | 1/2016 | Pikryl | G06F 30/30 |
| 9,690,630 B2* | 6/2017 | Sinha | G06F 9/5044 |
| 2012/0096445 A1* | 4/2012 | Berg | G06F 9/44547 |
| | | | 717/140 |

OTHER PUBLICATIONS

Acevedo J. et al.; "Hardware Acceleration for RLNC: A Case Study Based on the Xtensa Processor with the Tensilica Instruction-Set Extension"; Electronics; 2018; 7(9):180. (Year: 2018).*

Elghazali et al.; "A comparison of hardware acceleration methods for VLSI Maze routing"; 2009; 2009 IEEE Toronto International Conference Science and Technology for Humanity (TIC-STH); p. 563-568. (Year: 2009).*

Koeplinger, D., "Automatic Generation of Efficient Accelerators for Reconfigurable Hardware," IEEE, dated 2016.

"Automated Generation of Hardware Accelerators With Direct Memory Access From ANSI/ISO Standard C Functions," Altera White Paper, dated May 2006.

Savas, S., et al., "Designing Domain-Specific Heterogeneous Architectures from Dataflow Programs," School of Information Technology, Halmstad University, Halmstad, dated Apr. 2018.

Pellerin, D., et al., "FPGA-based hardware acceleration of C/C++ based applications—Part 3," EE Times, dated Aug. 15, 2007.

Acevedo, J., et al., "Hardware Acceleration for RLNC: A Case Study Based on the Xtensa Processor with the Tensilica Instruction-Set Extension," MDPI, Electronics 2018.

Hodjat, A., et al., "Interfacing a High Speed Crypto Accelerator to an Embedded CPU," IEEE, copyright 2004.

"Tensilica Introduces New Video Processor Engine With Main Profile H.264 Support," Cadence, Dec. 4, 2006.

"Tensilica Xtensa LX Processor Tops EEMBC Networking 2.0 Benchmarks," Cadence, May 16, 2005.

"TIE Language—The Fast Path to High-Performance Embedded SoC Processing," Cadence Design Systems, Inc., Copyright 2016.

"Xtensa® Instruction Set Architecture (ISA)," Reference Manual, Copyright 2010.

"Xtensa Processor Developer's Toolkit," Cadence Design Systems Inc., Copyright 2014.

* cited by examiner

METHOD, PRODUCT, AND SYSTEM FOR INTEGRATING A HARDWARE ACCELERATOR WITH AN EXTENSIBLE PROCESSOR

FIELD

The present invention is directed to approaches for designing programmable processing elements such as microprocessors and the like. More particularly, the invention is directed to the design of an application solution containing one or more processors where the processors in the system are configured and enhanced at the time of their design to improve their suitability to a particular application.

BACKGROUND

Historically, users developed programs on processors designed for running a large variety of computer programs. Because the same processor had to function well for a variety of applications, the processor would not be ideally suited for any individual application.

One way to address this issue is the inclusion of a hardware accelerator tailored to a user's needs—e.g., to allow the user to customize a processor configuration by adding new instructions. These instructions can then be evaluated for their performance for a particular application by simulating the instructions and at least the hardware accelerators execution thereof. Related matters, U.S. Pat. No. 6,477,683 to Killian et al. entitled "A System for Adding Complex Instruction Extensions to a Microprocessor" and U.S. Pat. No. 6,701,515 to Wilson et al. entitled "Automated processor generation system for designing a configurable processor and method for the same", incorporated by reference herein, describe some background information for the prior approaches and those herein where relevant.

Current techniques to provide these instructions and the accelerator for executing these instructions include two main limitations. First, the user must separately provide a design of the hardware accelerator (e.g., in a hardware description language). Second, the current automated techniques are limited to simple instructions that can be completed by the hardware accelerator in a single step. With regard to the first issue, separating the design of the hardware accelerator from the integration creates added challenges for validation, and increases the time needed to implement those changes. With regard to the second issue, when the hardware accelerator can only implement tasks that require a single step, the processor must micromanage the hardware accelerator by controlling each sub-step required to complete a multi-step instruction/operation. Because the processor is busy managing the sub-steps, the processor cannot perform as much useful work. Additionally, the control of each sub-step requires increased communications and therefore increased communication induced delays between the processor and the hardware accelerator.

Thus, what is needed is an improved method, product, and system that avoids the issues associated with current techniques.

SUMMARY

Embodiments of the present invention provide an approach for a method, product, and system for integrating a hardware accelerator with an extensible processor.

The approach illustrated herein includes the use of a description of instructions for invoking hardware accelerator and for a hardware accelerator to execute those instructions. In some embodiments, the instructions for invoking hardware accelerator and for execution by the hardware accelerator are described using a single language. These descriptions are then compiled into other languages for use in a tool chain for generating a simulator(s) (a hardware and instruction set simulator and a hardware accelerator simulator). In some embodiments, the approach illustrated herein can be combined with state machine functionality to manage the execution of instructions that require multiple states. In some embodiments, the approach illustrated herein can be combined with an external register file for transferring information between a processor and a hardware accelerator.

Other additional objects, features, and advantages of the invention are described in the detailed description, figures, and claims.

BRIEF DESCRIPTION OF FIGURES

In order that the present invention is better understood, some embodiments of the invention will now be described, by way of example only, with reference to the accompanying drawings.

DETAILED DESCRIPTION

Embodiments of the present invention provide an approach for a method, product, and system for integrating a hardware accelerator with an extensible processor.

Figure 1:
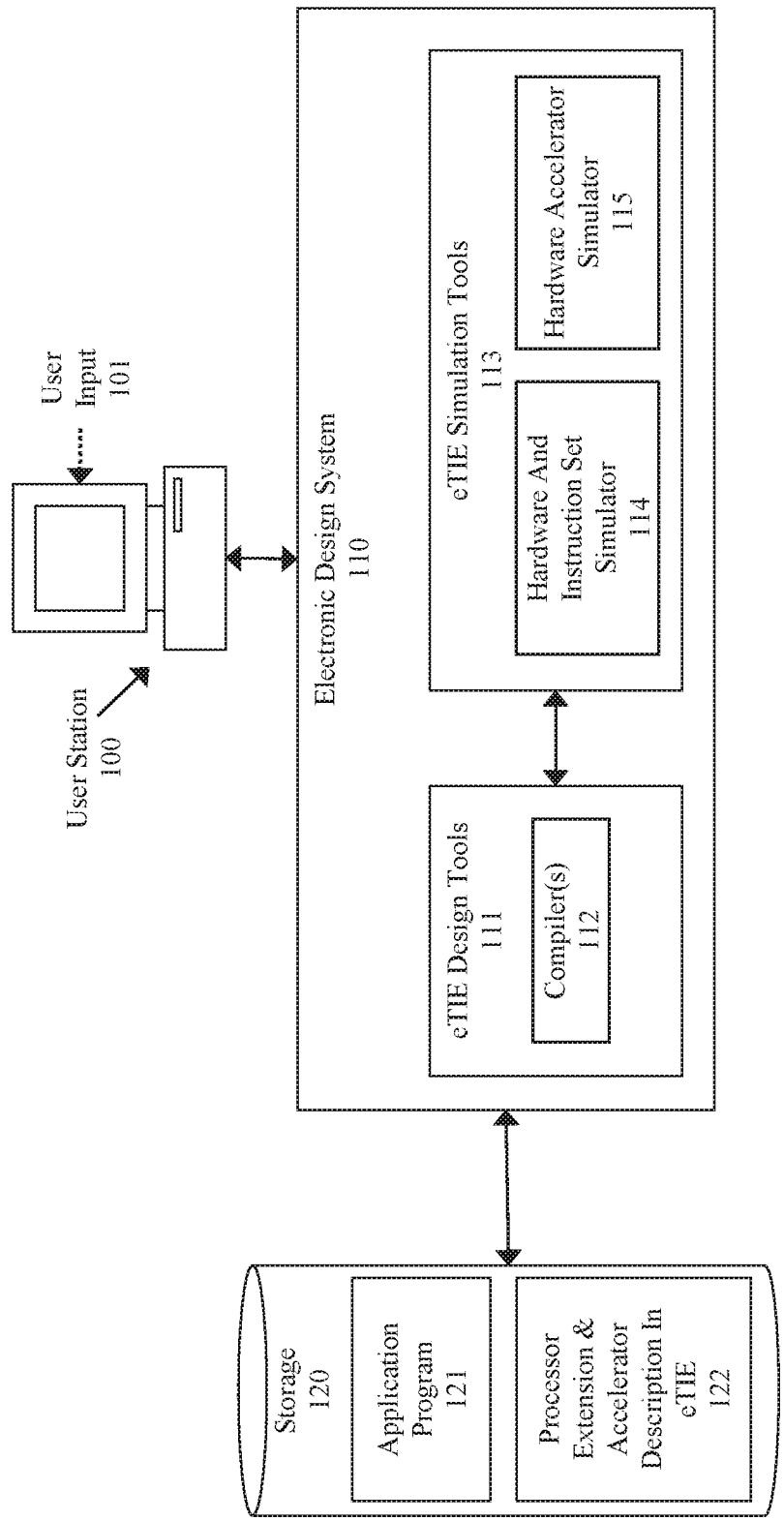
FIG. 1 illustrates an example system for integrating a hardware accelerator with an extensible processor according to some embodiments.

FIG. 1 illustrates an example system for integrating a hardware accelerator with an extensible processor according to some embodiments. Generally, the system provides for the description of instructions and hardware to execute those instructions using an electronic design system (EDS), along with integration of simulation functionality for use in developing a hardware accelerator and instructions for utilizing that hardware accelerator in an integrated environment using the same language. As will be discussed herein, the illustrated approach provides a simplified flow to a designer/engineer for development while allowing for more dynamic and independent development using multiple levels of compilers and functions.

As illustrated, FIG. 1 includes a user station 100, storage 120, and electronic design system 110.

In some embodiments, the user station 100 includes or provides access to the electronic design system 110 and controls how to integrate a hardware accelerator with an extensible processor. For instance, the electronic design system 110 might be located on the user station 100, on a remote device accessed by the user station, or distributed across multiple devices. The user station 100 allows for the user to interact with the electronic design system and to control the integration of the hardware accelerator with the extensible processor prior to manufacturing. The user station 100 comprises any type of computing station that is useable to operate or interface with a database 120. Examples of such user stations include workstations, personal computers, or remote computing terminals. In some embodiments, the user station 100 comprises a display device, such as a display monitor, for displaying a user interface to any users at the user station. The user station 100 also comprises one or more input devices for the user to provide operational control over the user station, such as a mouse or keyboard to manipulate a pointing object in a graphical user interface from which a user input 101 might be received.

The electronic design system 110, as illustrated, includes eTIE design tools 111 and eTIE simulation tools 113. As used herein, eTIE refers to an extension to the TIE (Tensilica™ Instruction Extension) language. As will be discussed further herein, eTIE allows for the hardware accelerator and the instructions for interfacing with the hardware accelerator to be described using the same language. In some embodiments, eTIE also allows for instructions that can utilize state machines to offload management of variable latency or very-long latency instructions (e.g. instructions that require multiple cycles to execute) to implement at the hardware accelerator. In some embodiments, the eTIE design tools 111 and/or the eTIE simulation tools 113, might be provided separately from each other and might be provided as part of, or separately from, the user station 100. In some embodiments, the various components, or the functions, of the electronic design system 110 are combined or separated into different components from those illustrated.

The eTIE design tools 111 allow for the description of a hardware accelerator (including an interface to the hardware accelerator) to be in eTIE and the instructions for the hardware accelerator to also be described with the same eTIE language. Additionally, the eTIE design tools include one or more compilers 112 that can compile the eTIE descriptions and can cross compile those with applications for use by the eTIE simulation tools 113. In some embodiments, the eTIE description can be combined with a hardware description or portion thereof as described by a hardware design language (e.g. Verilog™, VHDL, etc.).

A compiler, as is well known to those versed in the art, converts one thing to another. The electronic design system 110 allows the user to access user-defined instructions via intrinsics added to user applications (e.g., C and/or C++ applications). The compiler must translate the intrinsic calls into the assembly/machine language instructions for the user-defined instructions. Here, user applications written in at least one or more high level languages, such as C or C++, are converted into processor-specific assembly language. Similarly, a compiler might convert a hardware description written in eTIE to another type of language(s). In some embodiments, as will be described further below, the compiler may convert an eTIE description into multiple components which may comprise one or more high-level languages themselves and may be further compiled into lower lever representations—e.g. a processor extension & accelerator description in eTIE might be converted into various type of representations such as C and/or C++ for a cross-compiler and for a simulator, and into a hardware description language for a register-transfer level verification testbench. Generally, the high-level languages are designed to allow writers to describe their creation in a form that is human readable and is at a level that is often abstracted from the hardware the creation is to operate on. However, these high-level languages are not directly understood by processors. The compiler essentially translates the high-level language into another language (e.g., a lower level language) that is often specific to a particular device(s). This may take the form of a lower level language such as assembly language that is specific to a particular device or family of devices. The lower level representation can then be converted into machine language which can be directly executed by a device(s) but is difficult if not impossible for a human to read. In some embodiments, the high-level language is translated into a different form(s). For example, the eTIE high-level language may be translated into a hardware description language such as Verilog™. The hardware description language representation may be associated with a subsequent processing step(s) for a register-transfer level simulation and/or for generating a layout of a device that matches the described hardware description language device.

The eTIE simulation tools 113, comprise a tool(s) for simulating the operation of the extensible processor and hardware accelerator when executing operations for an application. For example, the eTIE simulation tools 113 might comprise a first tool to simulate the hardware (extensible processor) and instruction set executing an application 114 and a hardware accelerator simulator 115 for generating and simulating a register-transfer level representation. For example, the eTIE simulation tools map at least some of the application's instructions to the instructions of the extensible processor, and/or hardware accelerator, and generate cycle accurate results of processing any corresponding instruction (s). In this way, the simulation tools 113 allow a user to test and compare different designs for a particular application.

Building physical processors is a time-consuming and expensive process. When selecting potential processor configuration(s), a user cannot build a physical hardware accelerator for each potential choice. Instead, the user is provided with a software program called a simulator. The simulator, a program running on a computing device, is able to simulate the effects of running the user application on the user configured device(s). The simulator is able to mimic the semantics of the simulated device(s) and is able to provide a user with information indicating how and how fast the simulated device(s) are able to run a particular sequence of instructions (e.g. an application) and provide information to the user about how that sequence of instructions is executing. This could be performed using two simulators, a first for the hardware and instruction set (see e.g. 114) and a second for the register transfer level comprising a hardware accelerator simulator (see e.g. 115).

In some embodiments, a simulator, or simulation tools, includes a debugger. A debugger is a tool that allows users to interactively find problems within the device(s) being simulated and/or the software executing on the simulated device(s). A debugger allows users to interactively run their programs. The user can stop the execution of the program at any time and look at a corresponding location in the relevant source code. The user can also examine or modify the values of any or all variables or the hardware registers—e.g., at a break point. The user can then continue execution one statement at a time, one machine instruction at a time, to a new user-selected break point, or to a dynamically determined break point (e.g. at the end of a sequence of instructions or when a triggering event occurs).

The simulator decodes the user-defined machine instructions and models the semantics of the instructions and the performance of the instructions on the configured/simulated device(s). This includes the values and performance implications of different user-defined states. In some embodiments, the debugger allows the user to debug user-defined instructions.

An appropriate vehicle for specifying the user-defined instructions is the eTIE language which was originally developed as the TIE language by Tensilica™, Inc. of Santa Clara, Calif., and the extension of which is described here. The Tensilica™ Instruction Extension Language (TIE) Reference Manual Revision RI-2019.3 by Tensilica™, Inc. is incorporated by reference to show examples of TIE language instructions which can be used to implement such user-defined instructions. The Tensilica™ Instruction Set Architecture (ISA) Reference Manual Revision RI-2019.3 is also incorporated by reference.

In some embodiments, storage 120 comprises a database which as illustrated includes an application program 121, and processor extension and accelerator description in eTIE 122 which describes an instruction set and a hardware accelerator that implements the instruction set. In some embodiments, the storage 120 comprises a single database with one or more subsets within the database for the different types of data (e.g., application program 121 and processor extension and accelerator description in eTIE 122) as illustrated in FIG. 1. However, in some embodiments the database comprises multiple separate databases on different computing systems and/or in different locations connected via electronic communication links (e.g. wired and/or wireless networks). The system may further include a database access module(s) for accessing and storing the data, whether stored at a single database or at multiple databases. Additionally, the storage 120 could include multiple application programs and multiple accelerators/extensions for evaluation and/or testing/manufacture.

Figure 2:
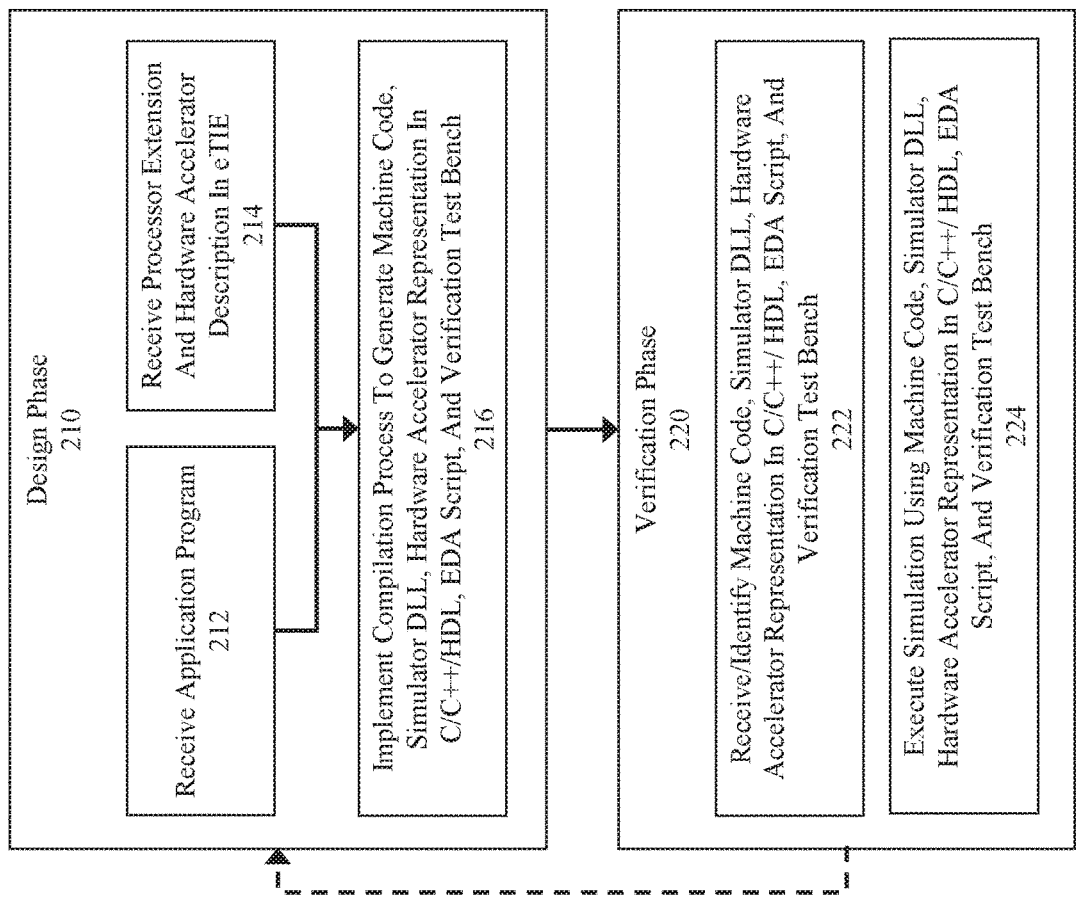
FIG. 2 illustrates a flow for integrating a hardware accelerator with an extensible processor and for analyzing/simulating that integration according to some embodiments.

FIG. 2 illustrates a flow for integrating a hardware accelerator with an extensible processor and for analyzing/simulating that integration according to some embodiments. The flow generally has two phases. The first phase comprises a design phase which utilizes the eTIE description of the hardware accelerator and the processor extension for controlling execution of instructions that the hardware accelerator implements to generate multiple elements for use in a verification phase and/or for deployment. The second phase is a verification phase that uses the elements created in the first phase to verify the correct operation and to evaluate the performance on a cycle by cycle basis. Both phases are discussed further in detail in subsequent figures. The phases are discussed here briefly.

In some embodiments, the design phase 210 includes receipt/identification of an application program 212, and receipt/identification of a processor extension and hardware accelerator description in eTIE 214, and implementing a compilation process to generate machine code, a simulation DLL (dynamic-link library), a hardware accelerator representation in a hardware description language (HDL), electronic design automation (EDA) script, and a verification test bench.

In some embodiments, the verification phase 220 includes receipt/identification of the elements generated in the first phase (machine code, the simulation DLL, the hardware accelerator representation in a hardware description language (HDL), electronic design automation (EDA) script, and a verification test bench) at 222 and use of those elements to execute a simulation process at 224.

In some embodiments, a third phase might be implemented that comprises a deployment phase. In the deployment phase, a processor extension and hardware accelerator description in eTIE that has been validated in the verification phase is deployed in a manufacturing process or in an environment on physical hardware.

Figure 3:
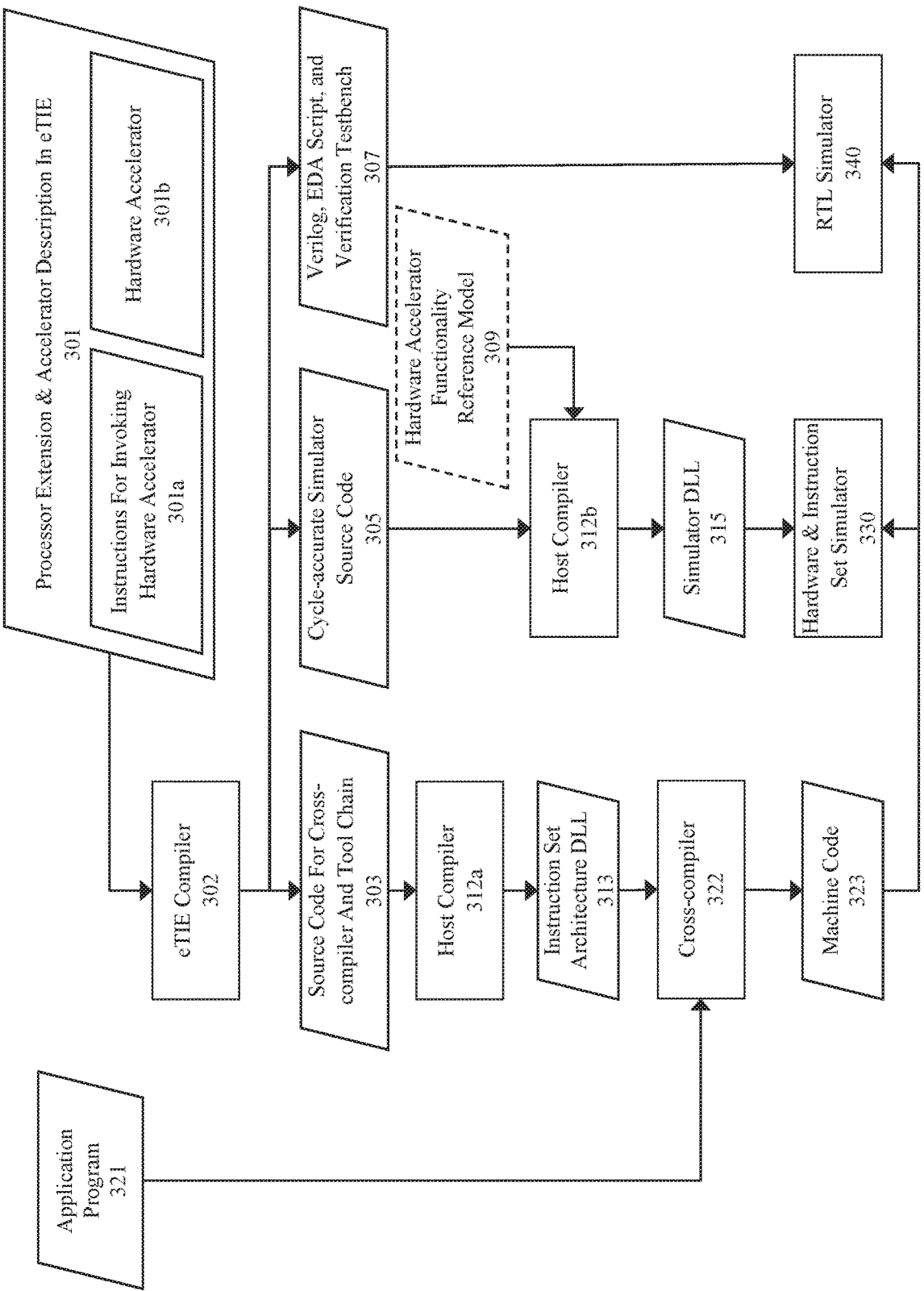
FIG. 3 illustrates a more detailed flow for integrating a hardware accelerator with an extensible processor and for analyzing/simulating that integration according to some embodiments.

FIG. 3 illustrates a more detailed flow for integrating a hardware accelerator with an extensible processor and for analyzing/simulating that integration according to some embodiments. Generally, the approach provides for the description of instructions and hardware to execute those instructions converted into various different forms allow for testing and utilization of the arrangement with an application program.

In some embodiments, a processor extension description is provided in eTIE at 301. The processor extension description comprises instructions for invoking the hardware accelerator 301*a* and the hardware accelerator 301*b* itself both in eTIE. By providing a mechanism for the instructions/extension to the described in eTIE along with the hardware accelerator description in eTIE, a user can rapidly prototype and test one or more arrangements as described herein.

Essentially, the eTIE language, allows the user to define processor extensions (instructions to be executed by a hardware accelerator) using the eTIE language. Much like other languages, eTIE requires a specific syntax and arrangement of statements/arguments that describe the relevant subject matter. Here that subject matter is the instruction(s) to be executed by the hardware accelerator and the hardware accelerator itself.

Example syntax for the instructions for invoking the hardware accelerator (see 301*a*) described in extended Tensilica™ Instruction Extension Language (eTIE) might comprise multiple different types of statements.

An operation might include a name, a specification of a relevant argument(s), an interface to be used, and a computation(s) to be performed such as the following:

operation name argument-list state-interface-list
{
  computation
}

The computation of an operation can include a module instance and a module can be defined as:

module name (arg-list)
{
  computation
}

An interface can be described at least as shown below and can include one or more of a queue interface, a lookup interface, and/or a register interface.

queue name width direction
lookup name output-width def-stage input-width use-stage rdy
register name {
  width: integer
  depth: integer
  short_name: string
  external: bool
  virtual: bool
}

An actual use case might look like the following:
queue INDATA 32 in
queue OUTDATA 32 out
operation QPUSH {in AR arr} {out OUTDATA}

```
{
assign OUTDATA=arr;
}
operation QPOP {out AR art} {in INDATA}
{
    assign art=INDATA;
}
lookup DEVICE_REG {37, Wstage} {32 Wstage+1}
operation MEM_WR {in AR ars, in AR arr} {out
    DEVICE_REG Out, in DEVICE_REG In}
{
assign DEVICE_REG Out={ars, arr[3:0], 1'b1};
}
operation MEM RD {out AR art, in AR arr} {out
    DEVICE_REG Out, in DEVICE_REG In}
{
    assign DEVICE_REG Out={32b0, arr[3:0], 1'b0};
    assign art=DEVICE_REG In;
}
regfile ETIE_XR{
    width: 32,
    depth: 2,
    short_name: exr,
    external: 1,
    direct bypass: 0
}
operation ETIE_XR_RD {out AR arr, in ETIE_XR ereg}
    assign arr=ereg;
}
operation ETIE_XR WR {out ETIE_XR ereg, in AR ars}
    { }
    assign ereg=ars;
}
```

Essentially, the eTIE code for the extensible processor describes the elements at the hardware accelerator that the extensible processor will interface with to perform the specified operation. As illustrated, AR indicates a core register file of extensible processor and arr/ars/art is the register of the AR register file; ETIE_XR is defined as an external register file in the eTIE hardware accelerator; and ereg is a register of external register file ETIE_XR.

Similarly, the hardware accelerator (see 301*b*) is defined as a module(s) like the modules used by operations as follows:
```
    module name (arg-list)
    {
        computation
    }
```
The hardware accelerator modules are wrapped by a package tag.
```
    package "name" "ETIE" " "
    endpackage "name"
```
The top-level module in hardware accelerator is indicated by a property.
```
    property etie_top_module {module_name}
```
The hardware accelerator can have its own interface like the advanced extensible interface (AXI) interface and/or private local memory interface.
```
    axi name
        width: integer
        id width: integer
        slave master: bool
    }
    memory name
        width: integer
        numword: integer
    }
```

A processor can share data memory with a hardware accelerator and an eTIE construct dataram is used to indicate which bank of which data memory of processor can be shared
```
    dataram name
        dram: integer
        bank: integer
    }
```
The modules in a hardware accelerator package can use the interface names as an input/output signal(s).
```
    module name (queue name1, lookup name2, register
        name3, memory name4, dataram name5)
        assign empty=name1.Empty
        assign req=name1.PopReq
        assign data=name1.Data
        assign data_in=name2. In
        assign data_out=name2.Out
        assign write_data=name3.WriteData
        assign name3.ReadData=read_data
        assign name4.Addr=addr
        assign name4.En=read_enable
        assign name5.Addr=addr1
        assign name5.En=read_enable1
    }
```
By doing so, the modules are bound to a processor interface automatically.

Example syntax for the hardware accelerator as described in the extended Tensilica™ Instruction Extension Language (TIE) might comprise the following:
```
    package " " "ETIE" " "
    module divide_quo_rem_32_s1( . . . )
    {
        . . . .
    }
    module divide_quo_rem_32_s2( . . . )
    {
        . . . .
    }
    module fifo ( . . . )
    {
        . . . .
    }
    property etie_top_module {ha_div32}
    module ha_div32(queue INDATA, queue OUTDATA,
        lookup DEVICE_REG)
    {
        wire csr0_en=DEVICE_REG. In[3:0]==4'b0;
        wire [27:0] csr0_data=DEVICE_REG.In[31:4];
        assign DEVICE_REG.out=csr0_en?csr0:32'b0;
        wire in_fifo_write=OUTDATA.Req;
        wire [31:0] in_fifo_data=OUTDATA.Data;
        assign OUTDATA.Full=in_fifo_full;
        . . . .
    }
    endpackage " "
```
Essentially, the eTIE code for the hardware accelerator describes the hardware of the hardware accelerator that is used to execute those instructions and to receive inputs and provide data to a requesting extensible processor.

To illustrate, in some embodiments, a hardware acceleration includes a top-level module (e.g., "ha_div32") that defines the interface between the extensible processor and the hardware accelerator. This interface would be used by the extensible processor to transmit relevant data and instructions to the hardware accelerator and to retrieve results from the hardware accelerator.

In one embodiment, the user invokes a tool, the eTIE compiler 302, to initiate processing of the processor extension and acceleration description 301 along with an application program 321. First, the eTIE descriptions of a processor extension including the instruction for invoking the hardware accelerator (see 301a) and the hardware accelerator (301b) are fed into the eTIE compiler 302. The eTIE compiler 302 generates multiple different items (see 303, 305, and 307). First, the eTIE compiler 302 generates the source code for a cross-compiler and a tool chain at 303 in a high-level language such as C/C++. Second, the eTIE compiler 305 generates a cycle-accurate simulator in a high-level language such as C/C++. Third, the eTIE compiler 302 generates register transfer level description of a hardware accelerator—e.g., Verilog™/VHDL for the hardware accelerator, an electronic design automation (EDA) script, and a verification testbench at 307. In some embodiments the register transfer level description can be used further in the development process, such as in synthesis, place and route, and other processes to ultimately support deployment of a device with the hardware accelerator.

The source code for the cross-compiler and tool chain 303 are input into a host compiler 312a that will generate the instruction set architecture (ISA) information for the cross-compiler 322. This may comprise first generating ISA information in C/C++ and then compiling that C/C++ source code into a DLL at 313. In some embodiments, the ISA information about the hardware accelerator includes the latency between data out and data in. The cross-compiler 322 calls the ISA info DLL to compile the hardware accelerator instructions (e.g., from the instructions for invoking the hardware accelerator from 301a) in a user's application program (see e.g., 321). The cross-compiler may comprise a modified version of an existing compiler such as the extensa compilers xt-xcc and xt-clang. As disclosed herein, the hardware accelerator can be loosely coupled or tightly coupled to a processor.

If the processor and hardware accelerator are loosely coupled, a memory can be read from and written to by both the processor and hardware accelerator such as through a tightly-coupled memory (TCM) interface. In such a configuration, an integrated direct memory access (IDMA) interface may be provided that copies data between the hardware accelerator (or a local buffer therein) and the TCM.

```
idma_init
idx0=idma_copy
while(didma_desc_done(idx0)==0)
check readiness of data on eTIE (polling or interrupt)
idx1=idma_copy
while(didma_desc_done(idx1)==0)
```

The readiness check can be performed using something similar to the following to poll the TCM, where the processor may implement a process to poll the hardware accelerator.

```
loop {
  ....
  sv v0, a1 (save to hardware accelerator local buffer via
     lookup interface)
}
(check readiness of data on hardware accelerator (polling
    or interrupt)) loop
lv, v0, a1 (load from hardware accelerator local buffer via
     lookup interface)
  ....
}
```

Transferring data from/to the TCM and the hardware accelerator can be accomplished according to the following:
   Write control status register (CSR) of hardware accelerator;
   hardware accelerator reads data from Processor DRAM;
   hardware accelerator processes the data read from the hardware accelerator DRAM;
   hardware accelerator writes data to Processor DRAM;
   Extensible processor reads CSR of hardware accelerator If the extensible processor and the hardware accelerator are tightly coupled there are two possible interface arrangements. First, an external register file may be used where the latency of at least some instruction to the hardware accelerator includes a specified latency or the compiler is aware of the latency of different instructions. Second, a queue/lookup arrangement might be used at least when no or insufficient latency information is provided and/or the compiler is not aware of the latency of the instructions.

If an external register file is used to connect the extensible processor and the hardware accelerator, any request to execute an instruction (request instruction) will cause processing to start in the hardware accelerator with any results being placed into a corresponding external register. The external register(s) with the results can then be read by the processor using an instruction to respond (respond instruction) specifying the external register(s) with the corresponding result(s). In some embodiments, the same external register number is an operand of both the request instruction and the corresponding respond instruction and can be used by the cross-compiler to determine that the two instructions have a data dependency. In some embodiments, the request instruction assigns a dummy value (e.g. 0) to the external register to trigger the dependency identification by the compiler. In some embodiments, the latency for some instructions are specified at the instruction level. In some embodiments, the compiler uses a predetermined latency value for one or more instructions. A latency value may serve as hint for compiler scheduling, the actual latency of that instruction executed in hardware accelerator may be variable. For example, both embodiments might be in a scenario with the following code:

```
loop {
  lv v0, a0, offset
  lv v2, a0, offset
  inst_request e0, v0, latency
  inst_respond v1, e0
  inst_request e1, v2, latency
  inst_respond v3, e1
  sv v1, a1, offset
  sv v3, a1, offset
}
```

This approach is ideal because it allows for the compiler to order the instructions in such a way that the processor can perform additional work while the hardware accelerator is operating on another instruction(s). For example, a request might comprise a sequence of steps that take a total of 6 cycles. Two of those cycles might comprise writing results into corresponding registers—e.g., a first cycle is used for the processor to write values into some number of registers at the hardware accelerator by the extensible processor, and a last cycle is used to write a result into some number of registers at the hardware accelerator by the hardware accelerator. The other four cycles might be used to execute the sequence of actions required to service the request at the hardware accelerator. As part of this, the processor might wait for five cycles for the results to be ready for retrieval. Alternatively, the processor could execute some number of instructions during those cycles instead of sitting idle. By making latency information available to the cross-compiler and possibly by supporting state machines at/for the hardware accelerator an improved approach can be achieved through smart scheduling.

The latency itself could be determined in multiple ways. For example, latency could be determined based on a data dependency between two instructions.

Normally compilers calculate the read after write latency between instruction based on the define and use stage of a respective operand. For example, the sub instruction uses the output from the add instruction:

add a, b, c
sub d, a, 1

The add instruction writes to "a", and the sub instruction reads from "a". The latency the is equal to the timing different between these two stages plus one, where the add instruction writing to "a" is the define stage, and the sub instruction reading from "a" is the use stage. Thus, the latency is then the define stage–the use stage+1. For example, if the define stage is 10, the use stage is 10, then latency=1.

For the instructions implemented in hardware accelerator, the read after write latency is passed to compiler by the latency parameter in an instruction.

inst_request e0, v0, latency
inst_respond v1, e0

Furthermore, where e0 is external register file, there is a data dependency through e0 between inst_request and inst_respond. In this case, the read after write latency is passed through instruction parameters instead of calculating from the define/use stage of e0 (see "latency").

In the tightly coupled arrangement using a queue/lookup scheme, a series of operations might be implemented for interfacing between the processor and the hardware accelerator using at least push and pop operations such as those that follow below. When the queue/lookup interface is used to connect the processor and the hardware accelerator, the push instruction is used to push data from processor to hardware accelerator and pop instruction is used to pop the return data from hardware accelerator. A virtual register can be used as an operand in the queue push and pop instructions at the processor. The same virtual register number in a push instruction and a pop instruction tells compiler that those two instructions have a data dependency. In some embodiments, the pop instruction has an immediate operand to indicate the latency from push instruction to pop instruction similar to that discussed above for the register file. Generally, the virtual register file description does not generate any real register file hardware but is instead only used by the cross-compiler to determine dependencies. In some embodiments, those dependencies are used to determine the latency of an operation and to allow for scheduling of work at the processor while those instructions are being executed at the hardware accelerator. An example of use of a queue might comprise the following:

```
loop {
  lv v0, a0, offset
  lv v2, a0, offset
  push(v0)
  push(v2)
  v1=pop( )
  v3=pop( )
  sv v1, a1, offset
  sv v3, a1, offset
}
```

Regardless of which approach is utilized, the cross-compiler 322 generates machine code 323 for simulation using the hardware and instruction set simulator 330 and/or the RTL simulator 340.

As previously indicated, at 305, the eTIE compiler transforms eTIE description into cycle-accurate simulator source code (a model) of the instructions and the hardware accelerator in a high level language (e.g. C/C++). The host compiler 312b compiles the model into a simulator DLL 315 which can be used/called by the hardware and instruction set simulator 330 to simulate at least the newly added instructions and the hardware accelerator. In some embodiments, the cycle-accurate simulation of instruction on the processor is slightly different from the cycle-accurate simulation of the hardware accelerator coupled to processor (see FIGS. 6A-6B). In some embodiments, an automatically generated cycle-accurate simulator source code can be replaced with a hand-crafted C reference model (see 309) which may result in a different simulator DLL 315. Generally, the hardware and instruction set simulator 330 simulates the hardware (extensible processor and hardware accelerator) and software by simulating the hardware using the high level description and executing the machine code.

In some embodiments, a user can switch between the hardware and instruction set simulator 330 and the RTL simulator 340. A user's application program then can use the newly added instructions and hardware accelerator for simulation at the register level from the hardware description in a hardware description language. A user's application program is compiled with cross-compiler (xt-xcc, xt-clang) using the ISA info DLL generated by eTIE compiler and the compiled machine code can be run, debugged, and profiled in the processor hardware and instruction set simulator 330 which can simulate the newly-added instructions and hardware accelerator and which can also be simulated on the RTL simulator 340 to verify that they operate in a functionally equivalent manner.

The eTIE compiler can also transform the eTIE description of eTIE instruction(s) and the hardware accelerator into a hardware description (RTL in Verilog™), with the hardware accelerator being integrated into the processor subsystem automatically. The RTL simulator can also run the machine code compiled from the user's application program to verify the functionality of the eTIE instructions as implemented by the hardware accelerator. The downstream EDA tools can also be invoked to check that the performance, power, and area (PPA) parameters are satisfied for the given design including the PPA of the newly added instructions and hardware accelerator.

An example is provided below for a cyclic redundancy check operation implemented using the eTIE language.

```
module crc32_step (out [31:0] new_state, in [31:0] old_
    state, in [31:0] poly)//leading 1 is removed.
{
  wire new bit=1'b0;
  wire [32:0] dividend, full_poly, remall;
  wire [31:0] dividend_hi;
  wire resultbit;
  assign {dividend_hi, resultbit}={new bit, old_state};
  assign dividend={dividend_hi, resultbit};
  assign full_poly={poly, 1'b1};
  assign remall=dividend^({33{resultbit}} & full_poly);
  assign new_state={remall[32:1] };
}
module crc32_step8(out [31:0] new_state, in [31:0] old_
    state, in [31:0] poly)
{
```

```
    wire [31:0] st7, st6, sty, st4, st3, st2, st1, st0;
    crc32_step crc32_step_i0(st0, old_state, poly);
    ; for (my $i=0; $i<6; $i++) {
        crc32_step crc32_step i'$i+1'(st'$i+1', sf$1, poly);
    ;}
    crc32_step crc32_step i7(new_state, st6, poly);
}
module ha_crc32
(
. . . .
)
{
    . . . .
    wire latch_new;
    wire ['$Q DATA WIDTH-1':0] in_data;
    wire [1:0] sel_in=state_cur—$STATE_C0';
    wire [7:0] crc_in=TIEmux(sel_in, in_data[7:0], in_data
        [15:8],
    in_data[23:16], in_data[31:24]);
    wire [7:0] crc_in_bv={' join(",", map("crc_in[".$_."]",
        0 . . . 7))'};
    wire [31:0] crc_state;
    wire [31:0] crc_state_new;
    wire crc_update=state_cur!=$STATE_IDLE';
    crc32_step8    crc32_step8    i0(crc_state_new,
        crc_state^{24'b0,
    crc_in_bv}, crc_poly);
    assign crc_state=TIEenFlop(crc_state_new, crc_up-
        date);
    assign fifo0_read=(crc_done==0 && (state_cur
        $STATE_IDLE' 11 state_cur==$STATE_C3'));
    assign in_data=TIEenFlop(fifo0_rdData, latch_new);
    assign    latch_new=(fifo0_empty==1'b0    &&
        fifo0_read==1'b1);
    fifo   #(1)   fifo_i0(fifo0_empty,   inQ_Full_tmp,
        fifo0_rdData,
    fifo0_read, inQ[32:1], inQ[0]);
    fifo #(1) fifo_i1(outQ_Empty, fifo1_full, outQ, outQ_
        PopReq,
    fifo1_wrData, fifo1_write);
}
```

Figure 4:
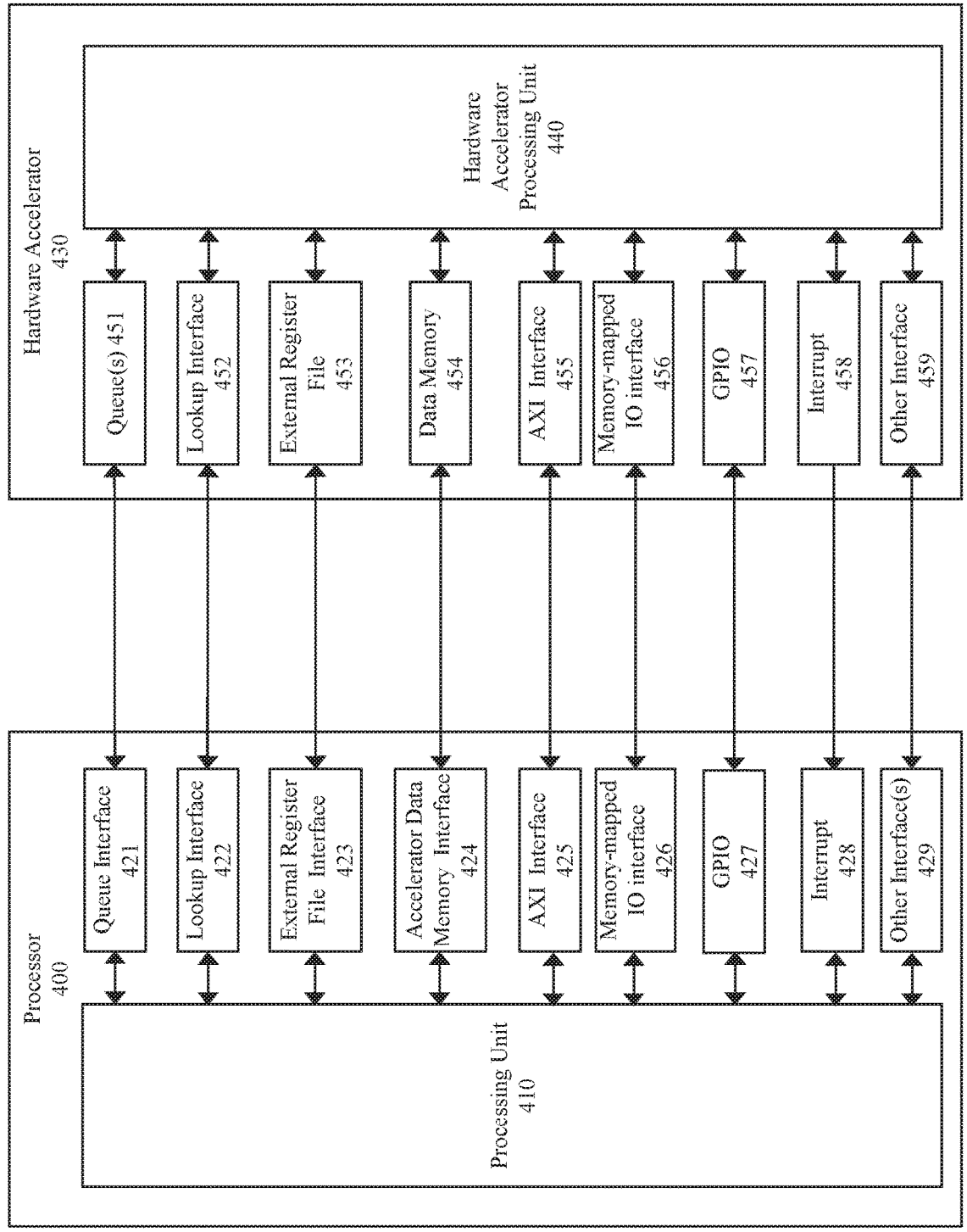
FIG. 4 illustrates multiple possible interfaces that could be provided to couple a processor to a hardware accelerator according to some embodiments.

FIG. 4 illustrates multiple possible interfaces that could be provided to couple a processor to a hardware accelerator according to some embodiments. Generally, the interface between the hardware accelerator may comprise any combination of elements from those illustrated herein. Additionally, other interfaces including standard compliant and custom interfaces could be included herein.

As an initial matter, a detailed description of some aspects of the architecture illustrated here have been discussed in detail in U.S. Pat. No. 8,539,399 to Andrews et al. entitled "Method and Apparatus for Providing User-defined Interfaces for a Configurable Processor", is incorporated by reference herein in its entirety and may provide additional details, where relevant to those provided herein.

Multiple possible interfaces could be provided to couple a processor (see processor 400) to a hardware accelerator (see hardware accelerator 430). The interfaces might comprise one or a combination of a queue, a lookup interface, an external register file, a data memory, an advanced extensible interface (AXI), a memory-mapped IO interface, a general purpose input output (GPIO) interface, an interrupt interface, or any other interfaces. Each interface might utilize a portion at the processor side (e.g., processor 400) and at the hardware accelerator side (e.g., hardware accelerator 430).

In some embodiments, a queue interface is provided at 421 for the processor that enables communication and exchange of information and monitoring of one or more queues 451 at the hardware accelerator 430. The queue interface 421 is coupled to the processing unit 410 and enables transmission of machine language instructions or opcodes and data from the processing unit to be processed according to those machine language instructions or opcodes. Furthermore, the queue interface 412 might further include one or more queues for storing information prior to transmission and for receiving information after processing by the hardware accelerator. In some embodiments, the queue interface 421 further includes elements for indicating which request corresponds to which response. Similarly, queue(s) 451 at the hardware accelerator 430 might be similarly arranged and might be coupled to elements within the hardware accelerator 440 for executing the operations indicated by the machine language instructions or opcodes on the data received at the queue.

In some embodiments, a lookup interface 422 is provided. The lookup interface is provided to enable the processing unit 410 to determine state information at the hardware accelerator. For instance, the looking interface 422, might be configured to query the lookup interface 452 which allows the hardware accelerator 430 to respond with relevant information. For example, the lookup interface 452 might enable responses regarding the contents of a queue (e.g. whether an outgoing queue at 451 is empty or not), of a memory (e.g. data memory 454 which may be tightly-coupled) or of an instruction (e.g. via a queue that holds information regarding the last instruction that finished executing, whether any instructions are currently executing, whether a queue is full, empty, or otherwise (e.g. an outgoing queue in 451), or whether results of an instruction have been written to a memory (e.g. data memory 454).

In some embodiments, the external register file interface 423 allows for at least reading and writing to/from registers in the external register file 453 at the hardware accelerator 430 by the processor 400. For instance, the external register file interface 423 includes circuits for enabling an instruction in the form of machine language or an opcode to be written to an instruction register at 453, and one or more values to be written to one or more data registers at the hardware accelerator 430. The hardware accelerator processing unit 440 can access the external register file for reading machine language instructions or opcodes and operands into the data path, and for writing results back into that register file.

In some embodiments, the accelerator data memory interface 424 is coupled to data memory 454 for exchanging information between the processing unit 410, and the hardware accelerator processing unit 440. In some embodiments, the accelerator data memory interface 424 and the data memory 454 are part of a tightly-coupled memory interface and further associated with an arbiter that manages the memory to avoid conflicts. In some embodiments, the accelerator data memory interface 424 may send read and/or write requests which are executed by the hardware accelerator when no conflict exists with an existing process at the hardware accelerator 430. In some embodiments the data memory 454 includes multiple ports. Regardless, the data memory 454 can be read from and written to by the hardware accelerator processing unit 440 as part of executing instructions.

Similarly, an AXI interface 425 and 455 can be provided at the processor 400 and hardware accelerator 430 as is known in the art. In some embodiments, the AXI interface can be used to fetch data from other sources besides merely the processor 400 and the hardware accelerator 430. For instance, a system memory may be accessible via an AXI interface for preloading data values according to a fetch instruction from the processing unit 410, which may also be received over the AXI interface from 425 and at 455.

In some embodiments, the memory-mapped IO interface 426 is coupled a memory that is designated for exchanging information between the processing unit 410, and the hardware accelerator processing unit 440. In some embodiments, the memory-mapped IO interface 426 may send read and/or write requests which are executed by the hardware accelerator when no conflict exists with an existing process at the hardware accelerator 430. In some embodiments the designated memory includes multiple ports. Regardless, the designed memory can be read from and written to by the hardware accelerator processing unit 440 as part of executing instructions using a similar module at the hardware accelerator 430.

In some embodiments, the processor 400 include a respective interrupt interface (see 428 and 458). The interface may be unidirectional or bidirectional, or any combination thereof, and may be used to trigger one or more interrupts. In some embodiments, the interrupts can be maskable, non-maskable, or a combination thereof. Additionally, the interrupts can be associated with a fixed interrupt response processes a user configurable response processes or some combination thereof.

Finally, other interfaces could be provided by a user/designer which may or may not include a module one or both of the processor 400 and/or the hardware accelerator 430. Additionally, the other interfaces can comprise any other standard compliant interfaces.

Figure 5:
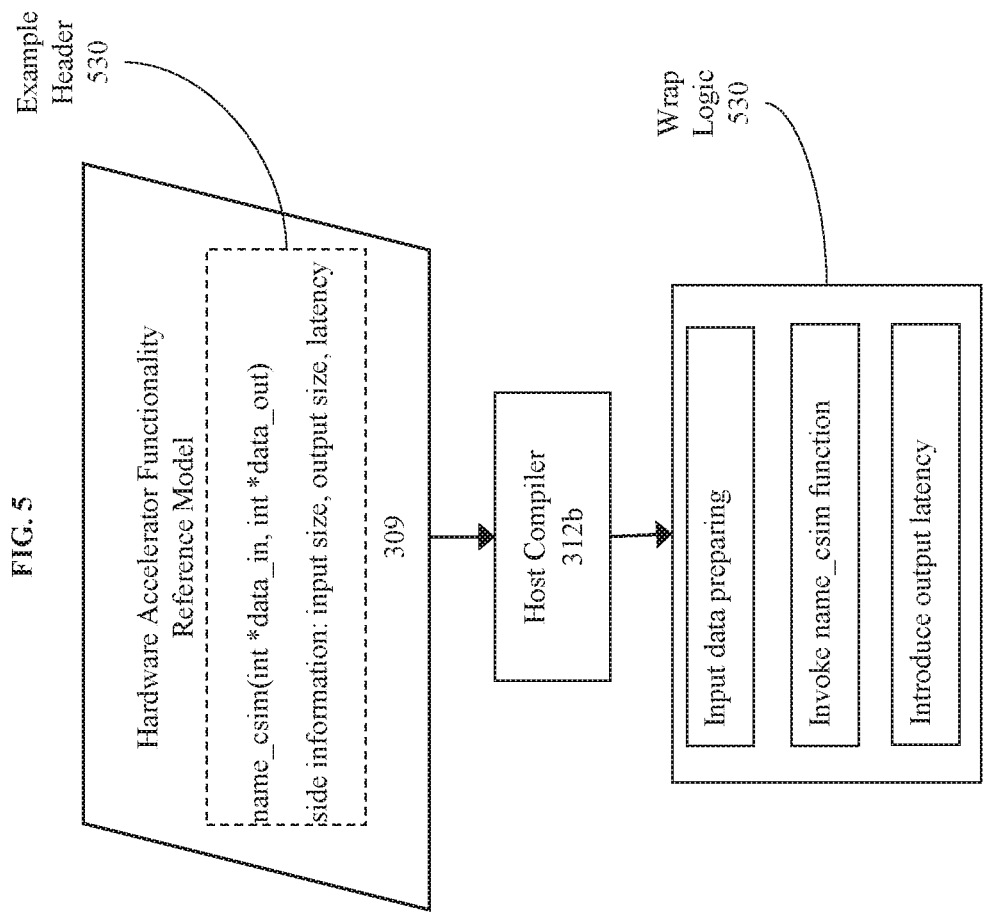
FIG. 5 illustrates aspects of the hardware accelerator functionality reference model according to some embodiments.

FIG. 5 illustrates aspects of the hardware accelerator functionality reference model according to some embodiments.

The hardware accelerator functionality reference model 309 might comprise one or more functions and/or corresponding headers. For instance, as illustrated the hardware accelerator functionality reference model 309 includes at least the example header at 530. The example header includes a named C/C++ simulator module ("name_csim") that operates on input data ("int*data_in") to generate output data ("int*data_out"). The header may additionally include other information here identified as "side information" which specifies the input size, the output size, and the latency for the module that may also be passed to the host compiler 312b.

When used, the hardware accelerator functionality reference model 309 can replace an autogenerated model from the eTIE compiler 302. If the hardware accelerator functionality reference model 309 is used, the host compiler 312b will generate wrapper logic for the hardware accelerator functionality reference model. This wrapper logic corresponds to input data preparing actions, an invocation action of the name_csim function, and an action to introduce output latency.

To further illustrate, eTIE code written by a user might be linked to a specific C/C++ function provided by a user before being sent to the hardware and instruction set simulator. The eTIE code might comprise at least the following:

queue INDATA 32 in
    queue OUTDATA 32 out
    operation QPUSH{in AR arr} {out OUTDATA}
    {
      assign OUTDATA=arr;
    }
    operation QPOP{out AR art} {in INDATA}
    {
      assign art=INDATA;
    }
    package " " "ETIE" "Sim"
    property top_module {ha_div32}
    property c_sim INDATA {size, latency, throughput}
    property c_sim OUTDATA {size, latency, throughput}
    module ha_div32(
    queue INDATA,
    queue OUTDATA) { }
    endpackage " "

The corresponding C/C++ function provided by a user might comprise at least the following:

c-name(int*in1, int_*in1_size, int in1_rdy, int*out1,
        int*out1_size, int *out1_rdy) {
    . . . .
    }

Figure 6B:
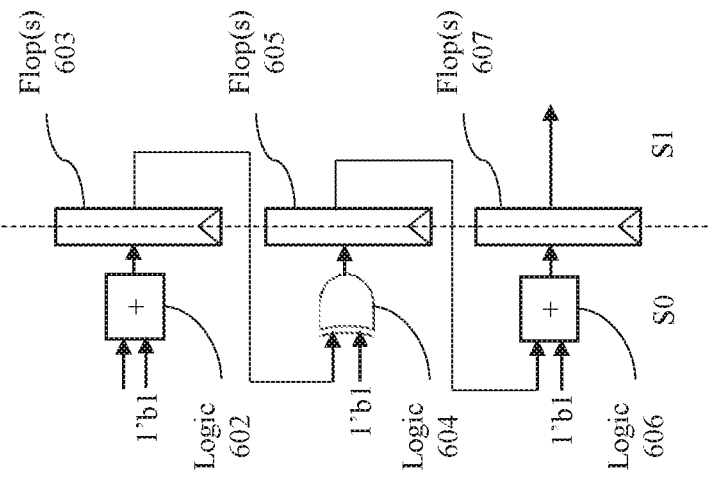
FIGS. 6A-6B illustrate example models used for scheduling execution of the eTIE instructions and hardware accelerator according to some embodiments.
Figure 6A:
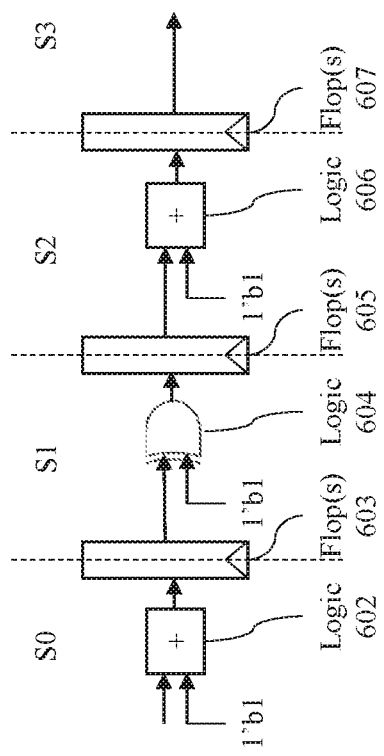

FIGS. 6A-6B illustrate example models used for scheduling execution of the eTIE instructions according to some embodiments.

FIG. 6A illustrates a generic model for representing the execution of an eTIE instruction as used in/by the hardware and instruction set simulator. Generally, an instruction will have some minimum number of cycles.

For example, as shown in FIG. 6A, the execution of each instruction can be broken into different execution pipelines or stages. For example, an instruction might correspond to or be defined by the following:

Module(in a, out b) {
      wire d1, d2, d2;
      assign d1=TIEflop(a+1'b1);
      assign d2=TIEflop(d1^1'b1);
      assign b=TIEflop(d2+1'b1);
    }

Each of the instructions cycles corresponds to different hardware, where the different operations are performed using different parts of that hardware. Generally, this can be modeled as a pipeline for the execution of the instructions and as a two stage arrangement for modeling the hardware. The hardware modeling is discussed further below in regard to FIG. 6B.

Here, the instruction provides an input "a", and an output "b". The module implements that instruction using two wires (d1 and d2). Wire d1 is defined by the TIEflop(b+1'b1) which is illustrated at state C0 in FIG. 6A, where 1'b1 is a value, possibly a static value, to be maintained at the hardware accelerator. Specifically, logic 602 implements the function for generating the input to the TIEFlop 603 for that stage which corresponds to a stage/cycle in the instruction. Wire d2 is defined by the TIEflop(d1^1'b1), which is to say that d2 is the assigned value d1 to the power of 1'b1. Thus, logic 604 implements the function for generating the input to the TIEflop 605 for that cycle. Finally, the output ("b") is defined by the TIEflop(d2+1'b1) which essentially adds 1'b1 to the previously defined d2. That is to say that logic 606 implements the function for generating the input to the TIEFlop 607 for that stage/cycle of which the output is "b". In some embodiments, multiple instructions can be modeled at once. For instance, during each cycle, each stage executes. When the stage executes it implements that corresponding cycle for the corresponding instruction. Thus, one instruction might be executing in S0, another in S1, and still another in S2 all during a single cycle. In the next cycle each instruction is advanced to the next stage. Thus, the instruction at 50 would move to S1, the instruction at S1 would move to S2, and the instruction at S2 would move to S3. The next cycle would then be executed and then the instructions are then advanced again. This process will continue until the simulation is complete with inactive stages possibly being skipped to conserve processing power.

Additionally, in some embodiments, the simulated execution of the instructions can also be combined with models of the interfaces used between the hardware accelerator to account for the cycle(s) to send and/or received data—e.g., in a and out b.

FIG. 6B illustrates a generic model for representing the execution of an eTIE instruction as used in by the hardware simulation of the hardware accelerator simulator. The description of FIG. 6A applies here where the same identifiers are used to the extent that a different description or aspect is noted herein.

To provide clarity, the function implemented by the corresponding module in 6B is similar to that of 6A. However, whereas the instruction simulator is concerned largely with the logical simulation of the instructions, the hardware accelerator simulator is concerned with the number of cycles and stages required to execute an instruction (provided the hardware is available to execute that instruction) the hardware accelerator simulator is directed towards matching the execution to the specific hardware at the hardware accelerator simulator. Thus, whereas the FIG. 6A approach merely illustrates a multi-stage pipeline approach, the FIG. 6B, according to some embodiments includes multiple cycles in a two stage pipeline. The two stage pipeline can be used to simplify the simulation process. In the first stage of the pipeline, any combinational logic is simulated, and in the second stage the operation of the registers is simulated. In some embodiments, the first pipeline stage logic needs to be executed twice, once before the instruction execution and one after instruction execution. In some embodiments, the second pipeline stage functions to simulate the register file and only needs to be executed once each simulation cycle. In some embodiments, the same underlying hardware is used for the pipelined execution of the function(s) of the module. In such an embodiment, a state machine may be provided that monitors which state the module is in to allow for management of the transition between states. In some embodiments, different hardware is used for each operation and/or to implement the function or functions of the module. Regardless of which approach is taken, or if a hybrid approach is taken of the two, the functional result should be essentially equivalent to the 6A process or an error has likely occurred.

System Architecture Overview

Figure 7:
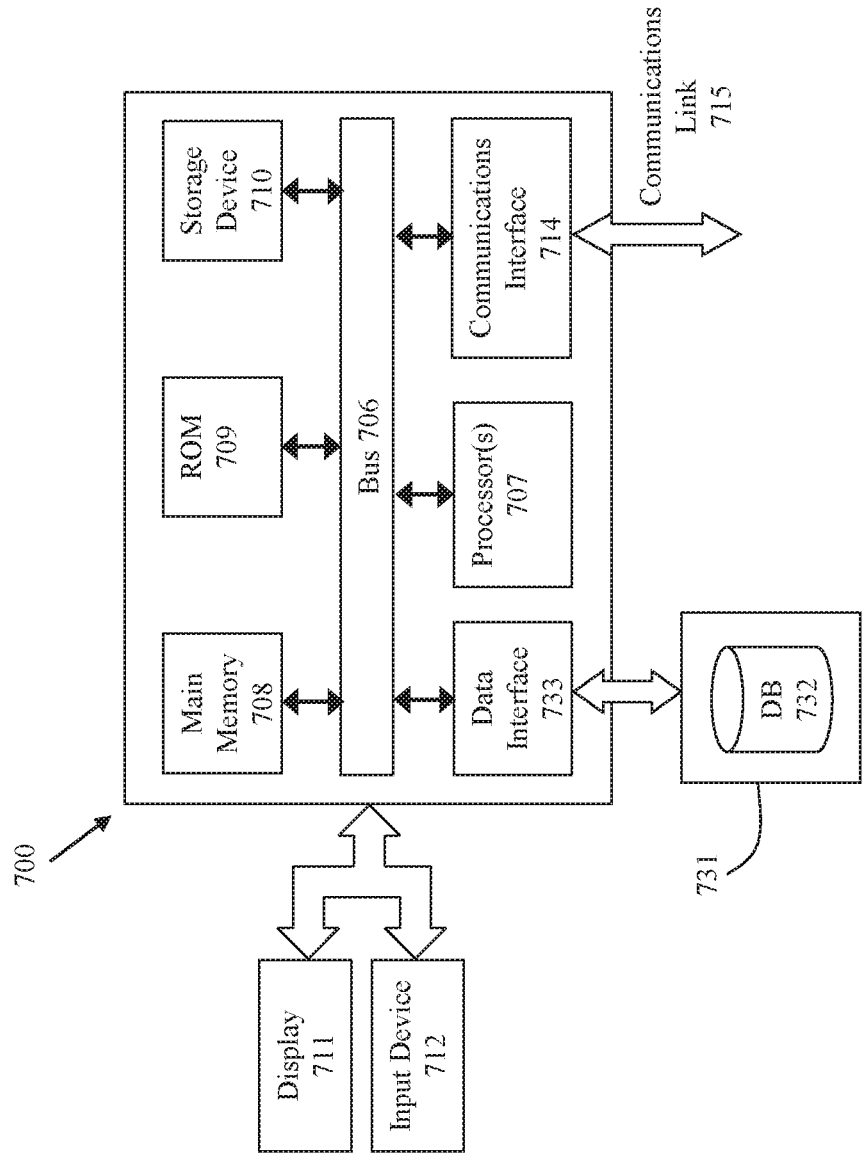
FIG. 7 shows an architecture of an example computing system with which the invention or parts of the invention may be implemented.

FIG. 7 shows an architecture of an example computing system with which the invention or parts of the invention may be implemented.

Computer system 700 includes a bus 706 or other communication mechanism for communicating information, which interconnects subsystems and devices, such as processor 707, system memory 708 (e.g., RAM), static storage device (e.g., ROM 709), storage device 710 (e.g., magnetic or optical disk drives), communication interface 714 (e.g., modem or Ethernet card), display 711 (e.g., CRT or LCD), input device 712 (e.g., keyboard), and cursor control.

According to one embodiment of the invention, computer system 700 performs specific operations by processor 707 executing one or more sequences of one or more instructions contained in system memory 708. Such instructions may be read into system memory 708 from another computer readable/usable medium, such as ROM 709 or storage device 710. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 707 for execution. Such a medium may take many forms, including but not limited to, non-volatile media and volatile media. Non-volatile media includes, for example, optical or magnetic disks, such as storage device 710. Volatile media includes dynamic memory, such as system memory 708.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 700. According to other embodiments of the invention, two or more computer systems 700 coupled by communication link 715 (e.g., LAN, PTSN, or wireless network) may perform the sequence of instructions required to practice the invention in coordination with one another.

Computer system 700 may transmit and receive messages, data, and instructions, including program, i.e., application code, through communication link 715 and communication interface 714. Received program code may be executed by processor 707 as it is received, and/or stored in storage device 710, or other non-volatile storage for later execution. Computer system 700 may communicate through a data interface 733 to a database 732 on an external storage device 731.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

Thus, disclosed here is a method product and apparatus for providing an improved solution that does not suffer, or does not suffer to the same extent, to the same issues as the prior techniques. For instance, the disclosed approach allows for designing the instructions/interface and the hardware accelerator to be used by an extensible processor using the same language in a single integrated development environment. Additionally, the approach included herein allows for improved utilization of the extensible processor while the hardware accelerator is servicing a request by enabling smarter scheduling using a cross-compiler and capturing latency information regarding execution of user defined functions.

What is claimed is:
1. A method, comprising:
receiving a description of a processor extension in a first high-level language and a description of a hardware accelerator in the same first high-level language;

receiving an application program comprising instructions in a second high-level language; and
implementing a compilation process to generate a verification test bench using the description of the processor extension in the same first high-level language, the description of the hardware accelerator in the same first high-level language, and the application program.

2. The method of claim 1, wherein implementing the compilation process comprises generation of machine code from the application program, and a simulator dynamic link library, a hardware representation, an electronic design automation script, and the verification test bench.

3. The method of claim 1, wherein implementing the compilation process comprises generating source code for a cross-compiler and an instruction set architecture dynamic link library.

4. The method of claim 3, wherein the instruction set architecture dynamic link library and the instructions of the application program are translated into machine code with the cross-compiler.

5. The method of claim 1, wherein implementing the compilation process comprises generating cycle-accurate simulator source code.

6. The method of claim 5, wherein the cycle-accurate simulator source code is compiled to generate a simulator dynamic link library, and the simulator dynamic link library is used to simulate operation of the hardware accelerator and an instruction set for the hardware accelerator.

7. The method of claim 1, further comprising implementing a verification phase, wherein the verification phase comprises:
identifying machine code, a simulator dynamic link library, a representation of the hardware accelerator, an electronic design automation script, and the verification test bench; and
executing a simulation process using the machine code, the simulator dynamic link library, the representation of the hardware accelerator, and the electronic design automation script, at the verification test bench.

8. The method of claim 1, wherein implementing the compilation process to generate the verification test bench supports generating a hardware accelerator representation that includes one or more state machines for executing multi-cycle instructions without control of each sub-step by an extensible processor.

9. The method of claim 1, wherein one or more multi-cycle instructions are associated with respective cycle latencies, and wherein a cross-compiler supports scheduling of operations at an extensible processor while at least one of the one or more multi-cycle instructions are to be executed at the hardware accelerator.

10. A non-transitory computer readable medium, having stored thereon a set of instructions, which when executed by a processor cause a set of acts, the set of acts comprising:
identifying a description of a processor extension in a first high-level language and a description of a hardware accelerator in the same first high-level language;
identifying an application program comprising instructions in a second high-level language; and
executing a compilation process to generate a verification test bench using the description of the processor extension in the same first high-level language, the description of the hardware accelerator in the same first high-level language, and the application program.

11. The computer readable medium of claim 10, wherein implementing the compilation process comprises generation of machine code from the application program, and a simulator dynamic link library, a hardware representation, an electronic design automation script, and the verification test bench.

12. The computer readable medium of claim 10, wherein implementing the compilation process comprises generating source code for a cross-compiler and an instruction set architecture dynamic link library.

13. The computer readable medium of claim 12, wherein the instruction set architecture dynamic link library and the instructions of the application program are translated into machine code with the cross-compiler.

14. The computer readable medium of claim 10, wherein implementing the compilation process comprises generating cycle-accurate simulator source code.

15. The computer readable medium of claim 14, wherein the cycle-accurate simulator source code is compiled to generate a simulator dynamic link library, and the simulator dynamic link library is used to simulate operation of the hardware accelerator and an instruction set for the hardware accelerator.

16. The computer readable medium of claim 10, wherein the set of acts further comprise implementing a verification phase, wherein the verification phase comprises:
identifying machine code, a simulator dynamic link library, a representation of the hardware accelerator, an electronic design automation script, and the verification test bench; and
executing a simulation process using the machine code, the simulator dynamic link library, the representation of the hardware accelerator, and the electronic design automation script, at the verification test bench.

17. The computer readable medium of claim 10, wherein executing the compilation process to generate the verification test bench supports generating a hardware accelerator representation that includes one or more state machines for executing multi-cycle instructions without control of each sub-step by an extensible processor.

18. The computer readable medium of claim 10, wherein one or more multi-cycle instructions are associated with respective cycle latencies, and wherein a cross-compiler supports scheduling of operations at an extensible processor while at least one of the one or more multi-cycle instructions are to be executed at the hardware accelerator.

19. A computing system comprising:
a memory for storing a set of instructions;
a processor for executing the set of instructions to provide an electronic design system, the electronic design system executing the set of instructions to cause a set of acts, the set of acts comprising:
retrieving a description of a processor extension in a first high-level language and a description of a hardware accelerator in the same first high-level language;
retrieving an application program comprising instructions in a second high-level language; and
generating a verification test bench by implementing a compilation process using the description of the processor extension in the same first high-level language, the description of the hardware accelerator in the same first high-level language, and the application program.

20. The computing system of claim 19, wherein the set of acts further comprise implementing a verification phase, wherein the verification phase comprises:

identifying machine code, a simulator dynamic link library, a representation of the hardware accelerator, an electronic design automation script, and the verification test bench; and executing a simulation process using the machine code, the simulator dynamic link library, the representation of the hardware accelerator, and the electronic design automation script, at the verification test bench.

\* \* \* \* \*